United States Patent
Malon

(10) Patent No.: US 6,409,007 B1
(45) Date of Patent: Jun. 25, 2002

(54) MECHANISM FOR AUTOMATICALLY DIRECTING AND DISPENSING PARTS

(75) Inventor: Stephane Malon, Romans (FR)

(73) Assignee: ADMV, Cremieu (FR)

( * ) Notice: Subject to any disclaimer, the term of this patent is extended or adjusted under 35 U.S.C. 154(b) by 0 days.

(21) Appl. No.: 09/700,260

(22) PCT Filed: May 7, 1999

(86) PCT No.: PCT/FR99/01080

§ 371 (c)(1),
(2), (4) Date: Jan. 23, 2001

(87) PCT Pub. No.: WO99/58433

PCT Pub. Date: Nov. 18, 1999

(30) Foreign Application Priority Data

May 14, 1998 (FR) .............................. 98 06336

(51) Int. Cl.⁷ .............................................. B65G 47/14
(52) U.S. Cl. ........................ 198/396; 198/400; 198/398
(58) Field of Search ............................... 198/396, 400, 198/398

(56) References Cited

U.S. PATENT DOCUMENTS

| | | | | | |
|---|---|---|---|---|---|
| 4,744,455 A | * | 5/1988 | Dragotta et al. | ............ | 198/389 |
| 4,911,282 A | * | 3/1990 | Melnikov et al. | ............ | 198/396 |
| 5,350,051 A | * | 9/1994 | Cooper et al. | ............ | 198/396 |
| 5,871,080 A | * | 2/1999 | Manzi et al. | ............ | 198/396 |
| 6,006,890 A | * | 12/1999 | Crawford | ............ | 198/396 |
| RE37,405 E | * | 10/2001 | Shirodera | ............ | 221/166 |
| 6,325,129 B1 | * | 12/2001 | Wright et al. | ............ | 156/538 |

FOREIGN PATENT DOCUMENTS

| | | |
|---|---|---|
| DE | 893 744 C | 10/1953 |
| DE | 89 11 221 U | 11/1989 |
| LU | 56 905 A | 1/1969 |
| US | 3 682 301 A | 8/1972 |

* cited by examiner

Primary Examiner—Christopher P. Ellis
Assistant Examiner—Rashmi Sharma
(74) Attorney, Agent, or Firm—Sughrue Mion, PLLC

(57) ABSTRACT

The mechanism (8) makes it possible to orient and dispense parts (29) that have an offset center of gravity with respect to the middle of their length (L). A first endless chain (9), extending in a vertical or oblique plane, with a horizontal upper strand, bears cups (11) distributed at regular spacing (P) and each cup having a receptacle (12) suitable for receiving one part (29). A second endless chain (10), extending in a plane perpendicular to that of the preceding chain, bears moving guides (21, 22, 23) distributed with the same spacing as the cups. The two chains (9, 10) are driven synchronously by a motor (15), the moving guides (21, 22, 23) passing above the cups (11) of the upper strand of the first endless chain (9), in correspondence with the intervals between the receptacles (12) of these cups. Means (25) to feed the parts (29) onto the mechanism (8). Application: mascara brushes, spray pumps, bottles, stoppers, etc., particularly in the cosmetics industry.

10 Claims, 3 Drawing Sheets

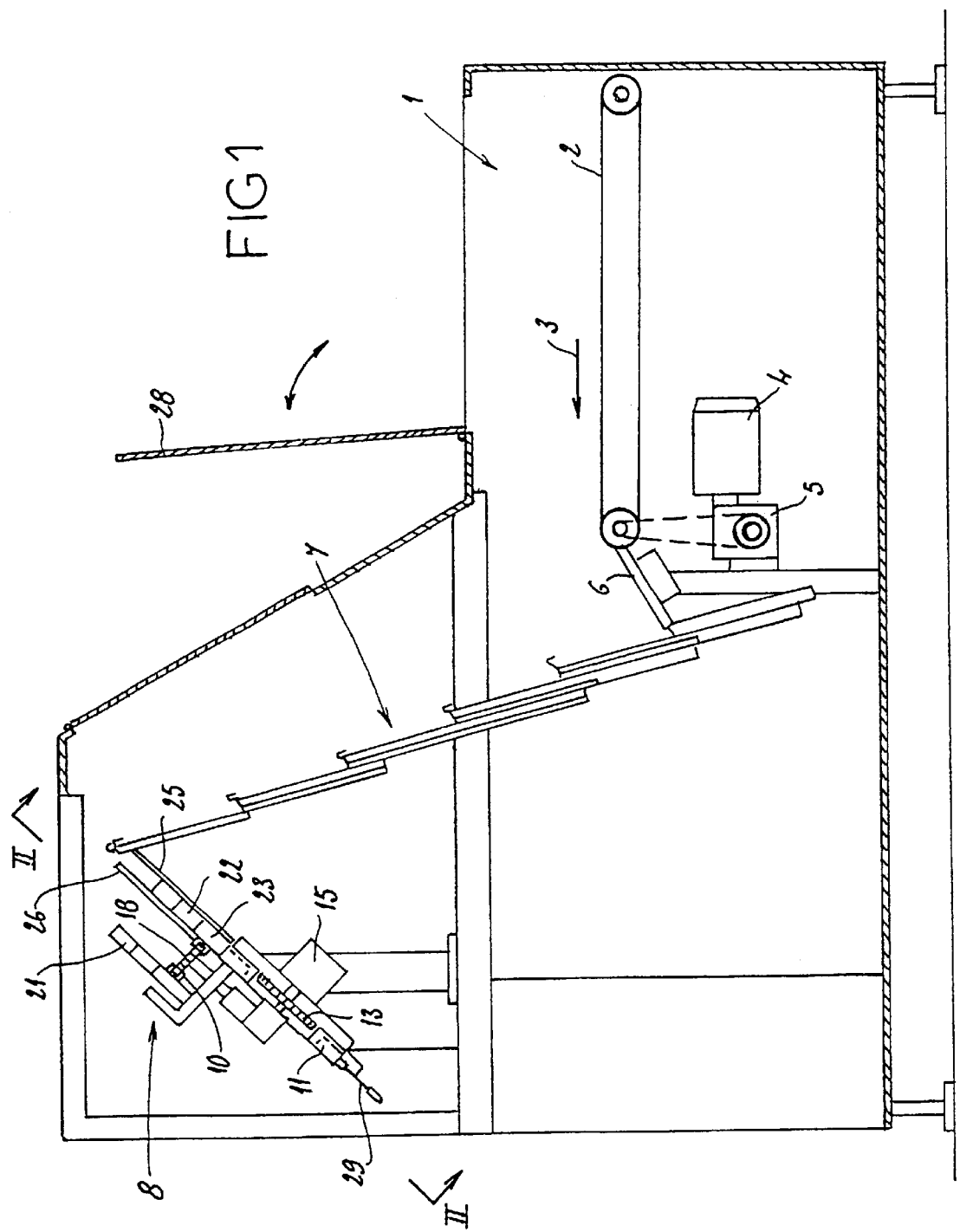

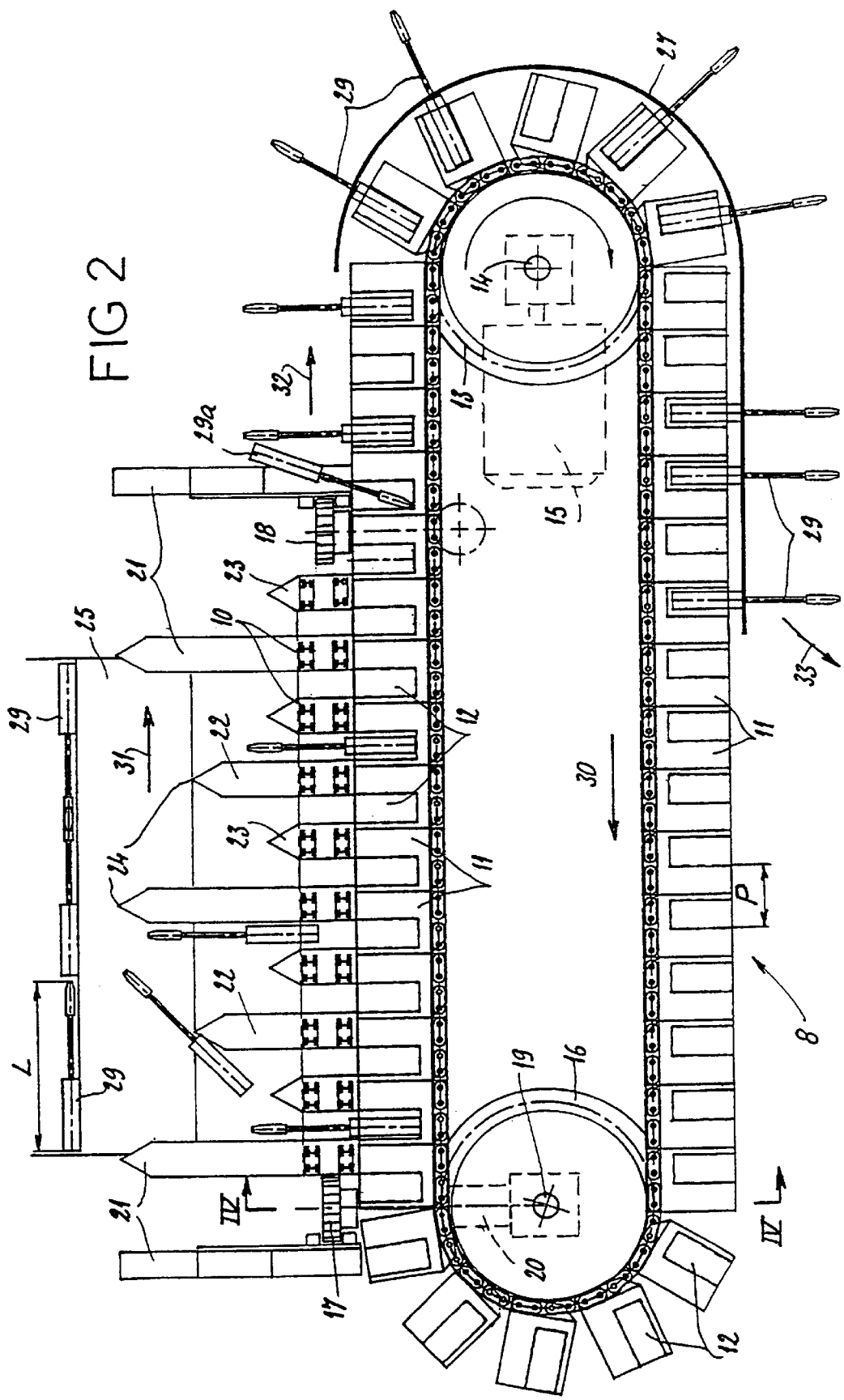

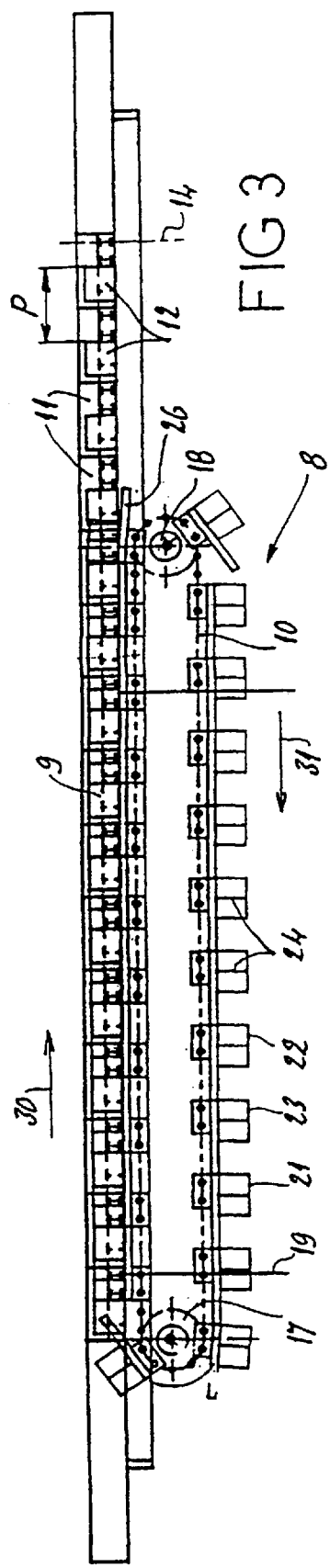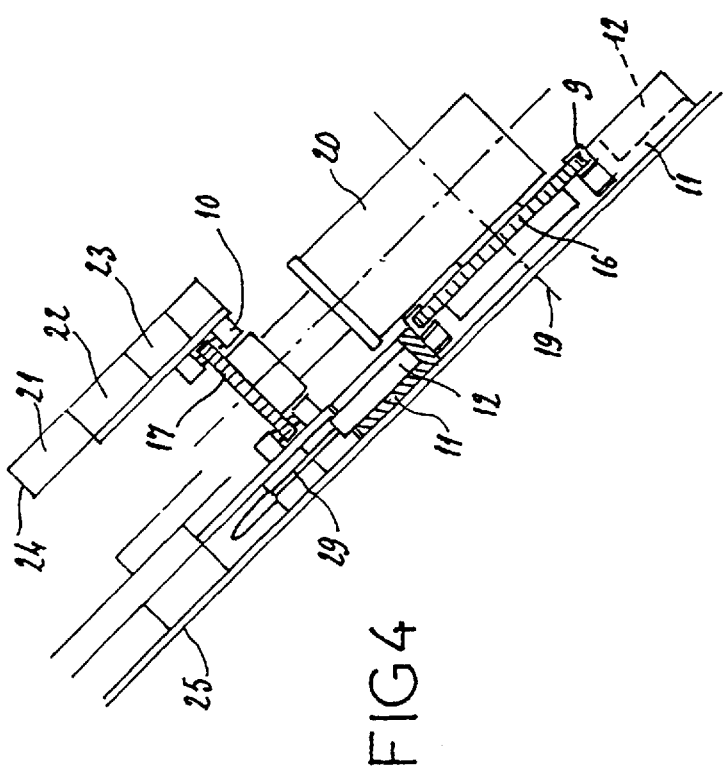

MECHANISM FOR AUTOMATICALLY DIRECTING AND DISPENSING PARTS

The present invention concerns a mechanism which, starting with a set of parts in bulk, enables those parts to be oriented and dispensed while preserving an orientation that can vary according to the application in question. More particularly, this mechanism is designed for the automatic orientation and dispensing of parts that have an offset center of gravity with respect to the middle of their length. As an example of such parts, mascara brushes could be cited, since their relatively heavy handle causes an offset of the center of gravity.

In general, in the industry the orientation and dispensing of parts is currently accomplished by means of vibrating bowl devices, or by means of blade feeders. These devices are not entirely satisfactory. In particular, they present risks of mechanical jamming, they do not allow orientation with complete reliability, they risk damaging the surface condition of fragile parts, and they have rather limited rates of dispensing. Moreover, current devices only accept parts of very specific dimensions, and they can not be adapted to parts of various sizes without major adjustment or modifications.

The present invention seeks to eliminate these disadvantages by furnishing, for parts of the type considered here, a particularly reliable orientation and dispensing mechanism that ensures a high rate of dispensing and is suitable for dispensing parts of variable dimensions with a minimum of adjustment, while preventing damage to said parts.

To that end, an essential object of the invention is a mechanism for the automatic orientation and dispensing of parts that have an offset center of gravity with respect to the middle of their length, this mechanism having essentially, in combination:

a first endless chain, extending in a vertical or oblique plane, with a horizontal upper strand, this first endless chain bearing cups distributed evenly over its full length, each cup having a receptacle suitable for receiving one part, a second endless chain, extending in a plane perpendicular to that of the first endless chain, the second endless chain bearing moving guides distributed evenly over its full length, with the same spacing as the above-mentioned cups, the moving guides passing above the cups of the upper strand of the first endless chain being situated to correspond with the intervals between the receptacles of these cups, synchronized, motorized drive means for these two endless chains, and means to feed the parts onto said chains, and means to guide the descent by gravity of said parts, feeding them to meet the moving guides before they fall into the receptacles of the cups of the upper strand of the first endless chain.

Thus a mechanism is produced that is capable of continuously processing parts to be oriented, starting from a stock of parts in bulk, a small quantity of parts being processed simultaneously. These parts are first emptied onto the mechanism per se, by the feeding means which, in particular, can be accomplished in the form of a blade feeder of a known type, which lifts the parts from a bulk storage hopper and releases them with a horizontal pre-orientation. The parts thus released fall, or slide on a steeply inclined plane, first to meet the moving guides, then to end their fall in the receptacles of the cups, where these parts are held in the "upright" position. In this way the parts are oriented because when they reach the tops of the moving guides, they tip over because for the most part their center of gravity is downward.

An appropriate configuration and distribution of the moving guides borne by the second endless chain ensure an effective orientation process.

Advantageously, these moving guides include guides of different heights, preferably all having at their upper end a point having two lateral faces of opposite pitch. According to one particular embodiment, these moving guides include guides of three different heights:

high guides, distributed along the second endless chain at intervals equal to four times the intervals of the cups carried by the first endless chain, guides of medium height, which also are distributed at intervals equal to four times the intervals of the cups, and attached to the second endless chain in the middle of the intervals separating the high guides, and low guides, distributed according to a spacing equal to or twice that of the intervals of the cups, and attached to the second endless chain in the intervals defined between the preceding high and medium height guides.

Preferably, the interval between two consecutive high guides is greater than the length of the parts to be oriented, in order to prevent these parts from becoming wedged between the guides, thus ensuring that they fall into the cups.

Moreover, the moving guides carried by the second endless chain are advantageously made of a plastic material in order not to damage the parts that fall on the points of the guides.

The operation of the mechanism for automatic orientation and selection of parts covered by the invention requires perfect synchronization of the drive of the two endless chains, in such a way as to maintain the intervals between the moving guides in correspondence with the receptacles of the cups located on the upper strand of the first chain, and thus to ensure that the parts fall all the way to the bottom of the cups. According to a particular embodiment of the invention, the synchronized motorized drive means of the two endless chains, bearing respectively the cups and the moving guides, are composed of a reducer motor coupled to a drive wheel around which the first endless chain, bearing cups, passes, while a ring and pinion transmission device connects the shaft of one of the drive or idler wheels of the first endless chain to a pinion gear around which the second endless chain, bearing the moving guides, passes.

It will be noted that the two endless chains are not necessarily of the same length. Advantageously, the upper horizontal strand of the first endless chain, bearing the cups, is extended beyond the second endless chain, bearing the moving guides, in the direction of movement of the cups. Thus, the moving guides retract at a certain point, while the cups continue their horizontal course on the upper strand of the first endless chain, forming a zone in which the parts that are improperly oriented in the cups (a small number of parts, but some nonetheless) can be automatically evacuated simply by their tipping over under the effect of gravity, their center of gravity being offset toward the top.

Beyond that zone of tipping and evacuation of improperly oriented parts, fixed guides are advantageously provided which enclose the first endless chain and its cups around one of the drive or idler wheels, and along a portion of its lower strand, to ensure that the properly oriented parts are held until a point of release where these oriented parts can be taken over by other transfer or processing means outside the orientation and selection mechanism.

On the whole, the invention enables an orientation and selection mechanism to be obtained that is compact, makes it possible to simultaneously process a small quantity of parts, using the principle of continuous transport which permits processing rates that are not achieved, or are poorly controlled, by current devices. Thus, the mechanism according to the invention can process between 60 and 150 parts per minute (depending on the parts to be dispensed).

Provided the moving guides are made of plastic, the mechanism covered by the invention also makes it possible to protect the surface condition and any decorations the processed parts may have. Thus, this mechanism can dispense fragile parts, such as finished parts or subassemblies to be used in filling, assembly or packaging.

The mechanism covered by the invention is also able to dispense parts of the same family, but having significant geometric and/or dimensional variations from one part to another. This can be done with a minimum of adjustments, with or without change of set-up, such as the set-up of the cups.

In any event, the invention will be better understood form the following description, with reference to the attached diagrammatic drawing, representing, by way of example, one embodiment of this automatic mechanism for the orientation and dispensing of parts:

FIG. 1 is a side view, with partial cross section, of a machine incorporating the mechanism covered by the present invention;

FIG. 2 is a front view of this mechanism, and can be considered to be a cross section along line II—II of FIG. 1, in an enlarged scale;

FIG. 3 is a top view of the mechanism visible in FIG. 2;

FIG. 4 is a cross sectional view of this mechanism along line IV—IV of FIG. 2.

The machine represented as a whole in FIG. 1 has a hopper 1 for storing parts in bulk, at the bottom of which there is an endless horizontal conveyor belt 2, driven in the direction of the arrow 3 by an electric motor 4, with the interposition of a reducer 5. In front of the endless conveyor belt 2 there is a short inclined plane 6 that feeds a blade feeder 7, of a known type, that extends obliquely upward to the top of the machine.

In this upper part there is, in an inclined position, the orientation and dispensing mechanism, designated as a whole by reference number 8, and represented in more detail in FIGS. 2 to 4.

The mechanism 8 has a first endless chain 9, or main chain, extending transversely in an oblique plane, and a second endless chain 10, extending in a plane perpendicular to that of the first chain 9, essentially at the level of the horizontal upper strand of this first chain.

The main chain 9 has on the outside, along its full length, cups 11 that are all identical, attached to the links of this chain 9 at a regular spacing P. Each cup 11 has a relatively deep receptacle 12, opening to the upper face of this cup 11, as well as to one of its lateral faces. The main chain 9 passes around a drive wheel 13, driven in rotation around its shaft 14 by a reducer motor 15, as well as an idler wheel 16.

The second endless chain 10 passes around a pinion gear 17 and an idler gear 18. The pinion gear 17 of this second chain 10 is driven in rotation, from the shaft 19 of the idler wheel 16 of the main chain 9, by ring and pinion gearing not detailed here, situated at 20, synchronizing the two chains 9 and 10.

The second endless chain 10 bears, laterally, moving guides of different heights 21, 22 and 23. The guides 21, 22 and 23 are attached laterally to the links of the chain 10, at a regular spacing equal to the spacing P of the cups 11. Moreover, the moving guides 21, 22 and 23 pass above the cups 11 of the upper strand of the main chain 9, being situated in correspondence with the free intervals between the receptacles 12 of these cups 11. However, the second endless chain 10 is shorter than the first endless chain 9. Thus, when the moving guides 21, 22 and 23 carried by the second chain 10 retract, the upper strand of the first chain 9, bearing the cups 11, extends a certain length in the direction of movement of these cups 11, before reaching the drive wheel 13. The return strand of the second chain 10 can pass in front of or behind the plane in which the first chain 9 turns.

All of the moving guides 21, 22 and 23 have a pointed upper end 24, having two lateral faces of opposite pitch. These guides 21, 22 and 23 are all made of plastic. Guides of three different heights are distinguished here:

The high guides 21 are distributed on the chain 10 at intervals equal to four times the spacing P of the cups 11.

The guides 22, of medium height, are also distributed at intervals equal to four times the spacing P of the cups 11, and are attached to the chain 10, in the middle of the intervals separating the high guides 21.

The low guides 23 are distributed at spacing equal to or twice the spacing P of the cups 11, and are attached to the second endless chain 10 at the intervals defined between the preceding guides 21 and 22.

An oblique sliding surface 25, parallel to the plane of the main chain 9, extends between the top of the blade feeder 7 and the region of the two chains 9 and 10. Also provided is a plate 26, which can be transparent, placed in front of the main chain 9 and blocking the lateral openings of the receptacles 12 of the cups 11. Finally, fixed guides 27 enclose said main chain 9 at one part of the path of the cups 11, particularly in a semi-circle around the drive wheel 13 and along one portion of the lower strand of this main chain 9.

When in operation, the endless conveyor belt 2 and the blade feeder 7 are activated so that the parts in bulk, which have previously been placed in the hopper 1 by opening the top hatch 28 thereof, are moved forward until they reach the top of the machine. As shown in FIG. 2, the parts 29, carried to the top of the machine by the blade feeder 7, are horizontally pre-oriented but in an uncontrolled direction (parts turned randomly to the right or left).

These parts 29 then reach the sliding surface 25 and fall onto the mechanism 8, the two endless chains 9 and 10 of which are driven synchronously in continuous movement according to the arrows 30 and 31, at adjustable speed.

As they fall, the parts 29 meet the guides 21, 22 and 23, and more particularly the points 24 of these guides. The parts 29 are channeled in their fall by these guides, and they end their fall in the receptacles 12 of the cups 11. It will be noted that the interval between two consecutive high guides 21 is greater than the length L of the parts 29, thus ensuring that these parts 29 fall and are prevented from becoming wedged in the horizontal position between the respective points 24 of two consecutive guides 21. Moreover, the slopes of the inclined faces on either side of each point 24 of a guide 21, 22 or 23, are also selected in such a way as to prevent any wedging of the parts 29 in an oblique position, which would prevent them from falling to the bottom of the receptacles 12 of the cups 11.

The long parts 29 involved here, the center of gravity of which is offset from the middle of their length L, tip and fall on the points 24 of the guides 21, 22 and 23, and continue their fall while being oriented parallel to these guides, for the most part with their center of gravity downward. The parts 29 finally fall into the receptacles 12 of the cups 11 situated at that instant on the upper strand of the main chain 9.

As this chain 9 is driven in the direction of the arrow 30, the parts 29 that have fallen into the cups 11 are moved forward in the direction of the arrow 32, avoiding the moving guides 21, 22 and 23 that are separated from the cups 11 and retract by passing, with the second chain 10, around the idler pinion 18. The improperly oriented parts in the cups 11, such as the part marked 29a, then have an oblique orientation and tip over so that they are automatically evacuated from the cups 11; these eliminated parts are returned to the stock of bulk parts.

The properly oriented parts 29 remain in place in the cups 11. When these parts 29 arrive in the region of the drive wheel 13, they are returned, being held by the fixed guides 27. Thus, these parts 29, all oriented in the desired direction, reach the underside of the lower strand of the main chain 9, where they are still held for a certain distance by the fixed guides 27.

Finally, after reaching the lower end of the fixed guides 27, the oriented parts 29 are released and can be extracted from the receptacles 12 of the cups 11, through the effect of gravity. The parts 29, being evacuated in the direction of the arrow 33, can be picked up at that place by another cup conveyor, by a conveyor belt (for stable parts) or by any other appropriate transfer device, or manually. The oriented parts 29 can also be picked up directly by a machine performing an operation on these parts.

The mechanism 8 for the automatic orientation and dispensing of parts as described above is applicable, among others, to mascara brushes, mascara bottles, spray pumps, vials, lipstick cases, plastic bottles, stoppers, and more generally, it is suitable for the orientation and dispensing of all parts, articles and products, in cosmetics and other industries, when the center of gravity of those parts is offset with respect to the middle of the length thereof.

As is evident, the invention is not limited to the embodiment of this mechanism for the automatic orientation and dispensing of parts as has been 4 described above, which is given solely by way of example; on the contrary, it includes all variants of embodiment and application that adhere to the same principle. In particular, the use of other means for the synchronized drive of the two chains 9 and 10, bearing respectively the cups 11 and the moving guides 21, 22 and 23, does not go beyond the scope of the invention, nor does changing the material with which these guides are made, nor by providing more or fewer categories of moving guides of different heights. In the same way, it would not be going beyond the spirit of the invention to use the same orientation and dispensing mechanism 8 in association with a feed device for the parts 29 other than a blade feeder, or to use this mechanism for parts that are not elongated in so far as said parts have a center of gravity that is offset with respect to their middle, along a certain direction designated as "length" but not necessarily corresponding to their largest dimension.

What is claimed is:

1. Mechanism for the automatic orientation and dispensing of parts (29) that have an offset center of gravity with respect to the middle of their length (L), characterized in that it has essentially, in combination:

a first endless chain (9), extending in a vertical or oblique plane, with a horizontal upper strand, this first endless chain (9) bearing cups (11) distributed at regular spacing (P) over its full length, each cup having a receptacle (12) suitable for receiving one part (29), a second endless chain (10), extending in a plane perpendicular to that of the first endless chain (9), appreciably at the level of the upper strand of this first chain (9), the second endless chain (10) bearing moving guides (21, 22, 23) distributed evenly over its full length with the same spacing (P) as the above-mentioned cups (11), the moving guides (21, 22, 23) passing above the cups (11) of the upper strand of the first endless chain (9) being situated to correspond with the intervals between the receptacles (12) of these cups (11), synchronized, motorized drive means (13 to 20) for these two endless chains (9, 10), and means (7, 25) to feed the parts (29) onto said chains (9, 10), and means to guide the descent by gravity of said parts (29), feeding them to meet the moving guides (21, 22, 23) before they fall into the receptacles (12) of the cups (11) of the upper strand of the first endless chain (9).

2. Mechanism for the automatic orientation and dispensing of parts according to claim 1, characterized in that the moving guides (21, 22, 23) borne by the second endless chain (10) are guides of different heights, and preferably all having at their upper end a point (24) having two lateral faces of opposite pitch.

3. Mechanism for the automatic orientation and dispensing of parts according to claim 2, characterized in that the moving guides (21, 22, 23) borne by the second endless chain (10) are guides of three different heights, to wit:

high guides (21), distributed on this chain (10) at intervals equal to four times the spacing (P) of the cups (11) borne by the first endless chain (9), guides (22) of medium height, also distributed at intervals equal to four times the spacing (P) of the cups (11), and are attached to the chain (10), in the middle of the intervals separating the high guides (21), and low guides (23) distributed at spacing equal to or twice the spacing (P) of the cups (11), and attached to the second endless chain (10) in the intervals defined between the preceding high and medium height guides (21, 22).

4. Mechanism for the automatic orientation and dispensing of parts according to claim 3, characterized in that the interval between two consecutive high guides (21) is greater than the length (L) of the parts (29).

5. Mechanism for the automatic orientation and dispensing of parts according to any of claims 1 to 4, characterized in that moving guides (21, 22, 23), borne by the second endless chain (10), are made of plastic.

6. Mechanism for the automatic orientation and dispensing of parts according to any of claims 1 to 5, characterized in that the synchronized motorized drive means of the two endless chains (9, 10), bearing respectively the cups (11) and the moving guides (21, 22, 23), are composed of a reducer motor (15) coupled to a drive wheel (13) around which the first endless chain (9), bearing cups (11), passes, while a ring and pinion transmission device (20) connects the shaft (19) of one of the drive (13) or idler (16) wheels of the first endless chain (9) to a pinion gear (17) around which the second endless chain (10), bearing the moving guides (21, 22, 23), passes.

7. Mechanism for the automatic orientation and dispensing of parts according to any of claims 1 to 6, characterized in that the upper horizontal strand of the first endless chain (9), bearing the cups (12), is extended beyond the second endless chain (10), bearing the moving guides (21, 22, 23), in the direction of movement of the cups (11), thus forming a zone in which the parts (29a) that are improperly oriented in the cups (11) can be automatically evacuated simply by their tipping over under the effect of gravity.

8. Mechanism for the automatic orientation and dispensing of parts according to claim 7, characterized in that, beyond that zone of tipping and evacuation of improperly oriented parts (29a), fixed guides (27) are provided which enclose the first endless chain (9) and its cups (11) around one of the drive (13) or idler (16) wheels, and along a portion of its lower strand, to ensure that the properly oriented parts (29) are held until a point of release where these oriented parts (29) can be taken over by other transfer or processing means outside the orientation and selection mechanism (8).

9. Mechanism for the automatic orientation and dispensing of parts according to any of claims 1 to 8, characterized in that the means for feeding the parts (29) are in the form of a blade feeder (7) which lifts the parts (29) from a bulk storage hopper (1) and releases them with a horizontal pre-orientation.

10. Mechanism for the automatic orientation and dispensing of parts according to claim 9, characterized in that an oblique sliding surface (25), parallel to the plane of the first endless chain (9), extends between the top of the blade feeder (7) and the region of the two chains (9, 10).

* * * * *